(12) United States Patent
Bergami

(10) Patent No.: US 7,637,972 B2
(45) Date of Patent: Dec. 29, 2009

(54) LOW RESISTANCE AIR FILTER DEVICE

(75) Inventor: Gaetano Bergami, Medicina (IT)

(73) Assignee: BMC S.r.l., Medicina (IT)

( * ) Notice: Subject to any disclaimer, the term of this patent is extended or adjusted under 35 U.S.C. 154(b) by 200 days.

(21) Appl. No.: 10/597,783

(22) PCT Filed: Feb. 9, 2005

(86) PCT No.: PCT/IB2005/000320

§ 371 (c)(1),
(2), (4) Date: Aug. 8, 2006

(87) PCT Pub. No.: WO2005/079952

PCT Pub. Date: Sep. 1, 2005

(65) Prior Publication Data

US 2007/0169450 A1   Jul. 26, 2007

(30) Foreign Application Priority Data

Feb. 12, 2004  (IT) .................. BO2004A000063

(51) Int. Cl.
*B01D 46/00* (2006.01)
(52) U.S. Cl. ................ 55/321; 55/498; 55/521; 55/410
(58) Field of Classification Search .......... 55/321, 55/498, 521, 410
See application file for complete search history.

(56) References Cited

U.S. PATENT DOCUMENTS

| 4,695,299 A | | 9/1987 | Spadaro et al. |
| 5,238,474 A | * | 8/1993 | Kahlbaugh et al. ............ 55/320 |
| 5,669,949 A | * | 9/1997 | Dudrey et al. ................. 55/486 |
| 6,638,330 B1 | * | 10/2003 | Bergami ...................... 55/315.1 |

FOREIGN PATENT DOCUMENTS

| EP | 1413347 A | | 4/2004 |
| GB | 1094617 A | | 12/1967 |
| WO | WO 01/43852 | * | 6/2001 |
| WO | WO 02/066812 | * | 8/2002 |

OTHER PUBLICATIONS

International Search Report, (PCT/IB2005/000320).

* cited by examiner

*Primary Examiner*—Duane Smith
*Assistant Examiner*—Sonji Turner
(74) *Attorney, Agent, or Firm*—William J. Sapone; Coleman Sudol Sapone P.C.

(57) ABSTRACT

A low resistance air filter device comprises a tubular case (2) for containing a filtering element (3) fixed to a lower opening (9) of the case (2). The tubular case has an upper opening (10), with outlet means (8) provided with an air outflow opening (7). The outlet means (8), at the outflow opening (7), are provided with a tubular body protruding toward an inside tubular case (2) and connect in flow communication the inside volume of the tubular case with the outflow opening (7).

18 Claims, 3 Drawing Sheets

LOW RESISTANCE AIR FILTER DEVICE

TECHNICAL FIELD

The present invention relates to the technical field concerning filter devices for the air destined to be used in an air-fuel mixture sucked in by combustion engines and particularly to a low resistance air filter device.

The known filter devices comprise an air filter, having a form that may be flattened, cylindrical or conic, contained in a respective case having an inlet opening in flow communication with an air intake and a having an outlet opening connected to the engine.

BACKGROUND ART

It is known that cases which have openings connected to the engine, downstream of the filter in comparison to the air flow, will introduce strong resistances and turbulences that cause the drawback of reduced air flow to the engine.

It is known to provide cases for filters with an inner link between the inlet opening and the side wall sized to reduce the air resistance.

A drawback of such filtering devices consists in that the link allows the passage of a possible extraneous object, for instance nuts or screw forgotten or fallen in the case of the filter, in the inlet collectors of the engine with serious damage risks. The risk of an extraneous object being present is particularly relevant in a racing filter device as these are continuously being opened for inspections, cleaning, substitution also during the hurried work being performed on different parts of the engine at the same time.

Further drawbacks of the known filters are that they increase the weight and they reduce the inside volume for the air.

U.S. Pat. No. 4,695,299 discloses a cyclone having at its upper outlet side a filter. The filter comprises a tubular housing having an inlet at its lower end and an outlet at its opposite upper end. A cylindrical filter element is installed in connection with the inlet opening and a tubular body forming the outlet opening protrudes towards inside said tubular casing.

DISCLOSURE OF THE INVENTION

A purpose of the present invention is to propose an air filter device having low resistance and able to stop a possible extraneous object, also of big dimensions, within in the case.

A further purpose of the present invention is to propose a device which reduces air resistance without reducing the useful volume of the device and without getting heavy.

Another purpose is to propose a device that can be easily housed in the engine compartment.

The above mentioned objects are achieved according to the content of the claims.

BRIEF DESCRIPTION OF THE DRAWINGS

The characteristics of the present invention are detailed in the following with particular reference to the enclosed drawings, in which.

BEST MODE OF CARRYING OUT THE INVENTION

Figure 1:
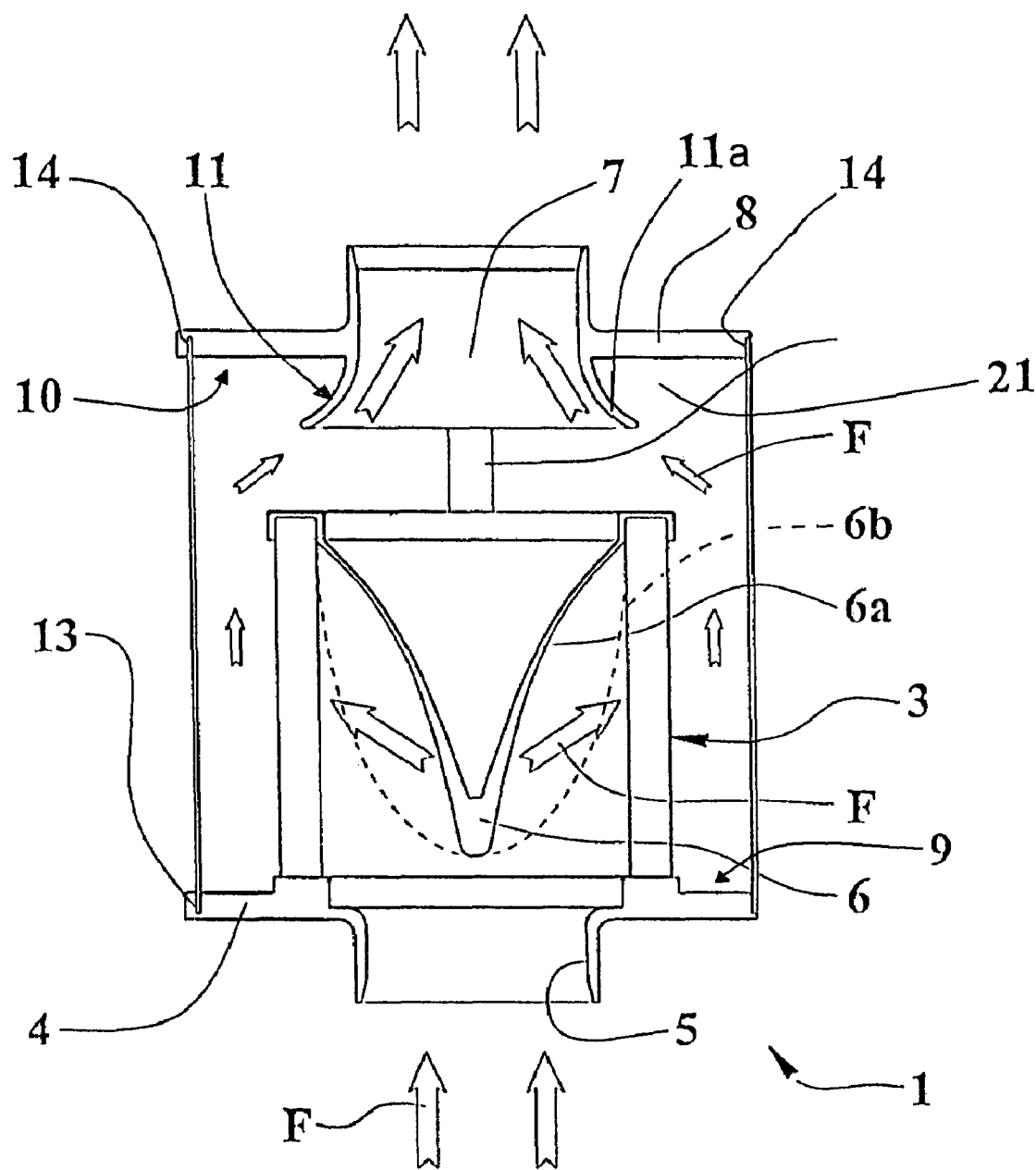
FIG. 1 shows a schematic longitudinal section view of the device of the present invention, taken along line 1-1 of FIG. 2.
Figure 2:
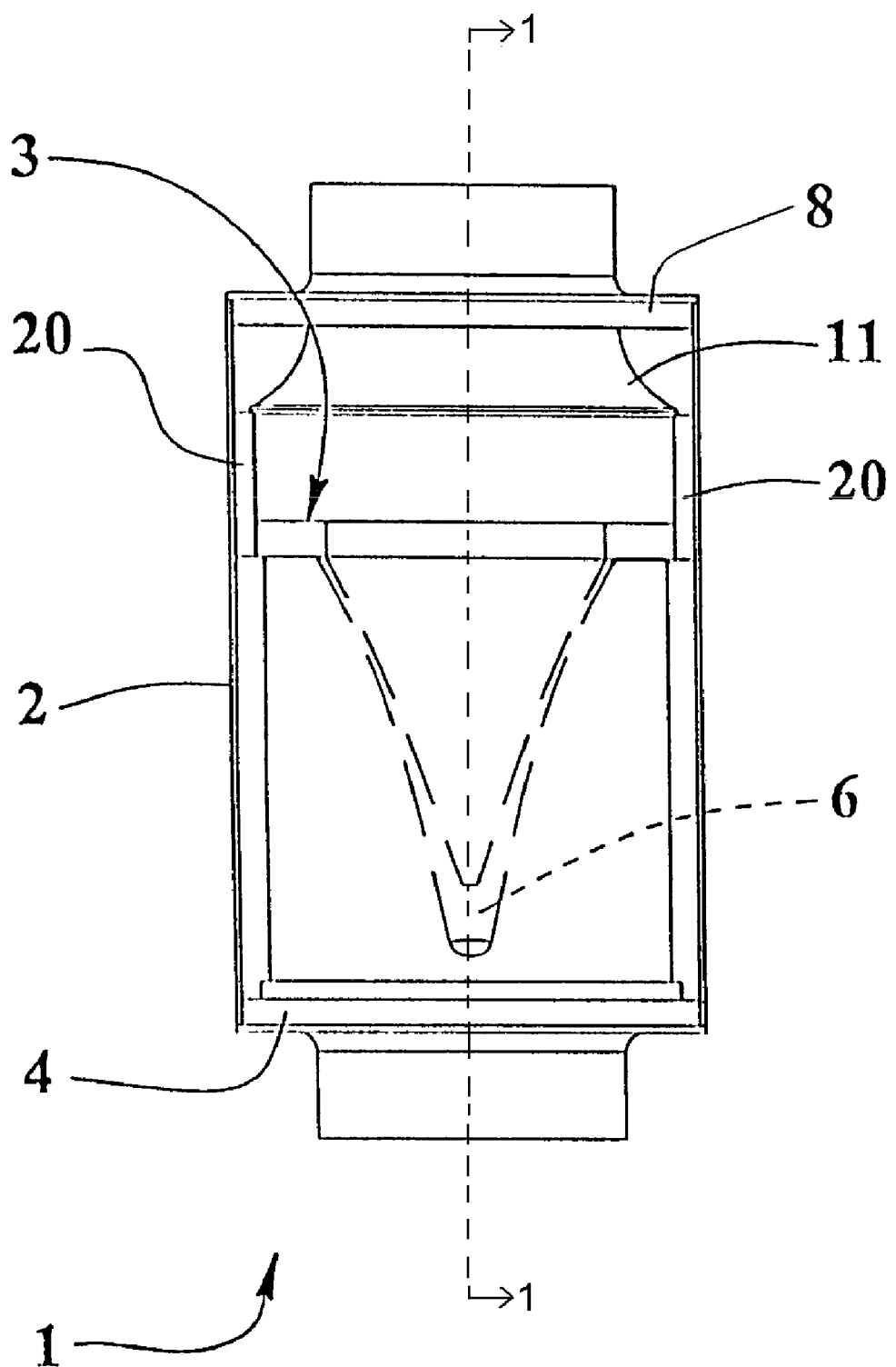
FIG. 2 shows a longitudinally sectioned side view of the device of the present invention.
Figure 3:
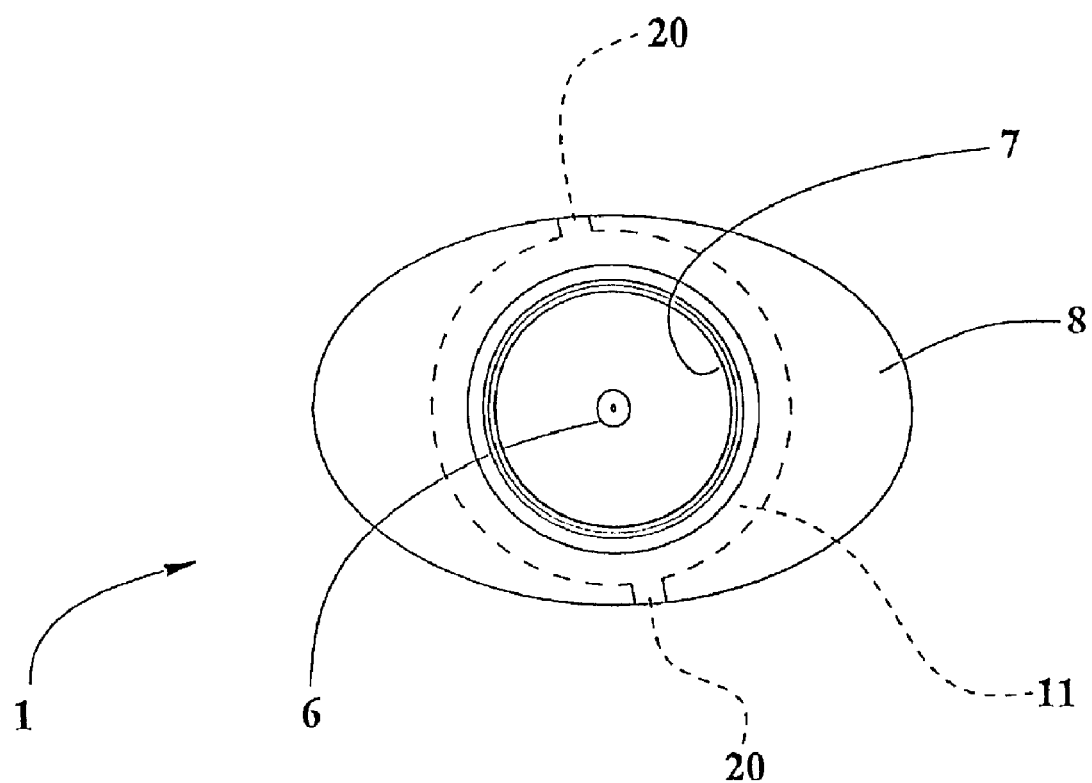
FIG. 3 shows a top view of the device of the present invention.

With reference to FIGS. 1-3, 1 indicates a low resistance filter device for the feeding of combustion engines mainly including a tubular case 2, a filtering element 3, support means 4 and a outlet means 8.

The tubular case 2 has an elliptic or oval section and is provided with an lower opening 9 and an upper opening 10. Furthermore the tubular case is preferably made of carbon fiber so that it acts as a thermal insulator between the external environment and the air passing through. The tubular case 2 is fixed to the support means 4 by fixing means (not shown) consisting of a screw or of a fastener.

The outlet means 8 are constrained to the upper opening 10 of the tubular case 2 and centrally provided with an outflow opening 7 in correspondence of which the outlet means present a tubular body 11 protruding toward an inside of the tubular case 2. The tubular body 11 provides flow communication, between the inside volume of the tubular case 2 and the outflow opening 7.

The outlet means 8 has a trumpet shaped flange 11a which is integral with the tubular body 11 being shaped similar to a trumpet outlet.

Preferably the trumpet flange 11a of the tubular body 11 expands, or enlarges, toward an inside of the device 1. In alternative, the invention provides that the tubular body 11 is narrowed, or is restricted, toward an inside of the device 1 assuming a truncated ogive shape.

The outlet means 8 are peripherally provided of a recess 14 for the housing of the inside wall of the tubular case 2 in its upper opening 10. The outlet means 8 are detachably fixed to the tubular case 2 by means of screw or fastener fixing means (not shown).

The device includes support means 4 fixed at the lower opening 9 of the case 2 and sized to retain the filtering element 3 at an air inlet opening 5 of the support means 4.

The support means 4 are discoid shaped and centrally provided with the inlet opening 5 linkable to air intakes of a vehicle. An inner throat of the support means 4 houses an end of the filtering element 3 that can be fixed integral with the support means 4, for instance by means of adhesive or plastic material melting. In the alternative the end of the filter can be detachably housed in a respective throat of the support means 4, being an annular shaped seat.

The support means 4 are peripherally provided of a seat 13 for housing the inner wall of the tubular case 2 at the lower opening 9. The support means are made of nylon strengthened with glass fiber.

The filtering element 3 has a cylindrical form and is made of cotton soaked with low viscosity oil. It is internally provided with air deflecting means 6, connected to a free end of the filtering element 3 in such way that the air flow entering from the opening 5, and pointed out by the arrows F of FIG. 1, is forcedly deflected by the deflecting means 6 toward the filtering element 3. The deflected air flow crosses the filtering element 3, crosses the interspace formed by the filtering element and the external case 2 and exits, through the tubular body 11, out the outflow opening 7 in the direction of the engine.

The deflecting means 6 are substantially shaped as a cone whose vertex is directed toward the inlet opening 5 and whose base is integrally fixed to the free edge of the filtering element 3. In the alternative it is provided that the free edge of the filtering element 3. detachably matches the base of the deflecting means 6. The substantially conic shape of the deflecting means 6 can have a concave profile 6*a* or convex 6*b* for instance of a parabolic kind. More particularly, the almost conic shape of the deflecting means 6 has an axial section shaped as two half-parabolas with parallel axes and joined branches at the vertex of the deflecting means 6 making the profile concave 6*a* or convex 6*b*.

The device includes spacer means 20, for instance made of plastics and of prismatic form, interposed between the tubular body 11 and the filtering element 3 and matching the inner wall of the tubular case 2 for the centering and stopping of the filtering element 3.

The operation of the device provides that the recess 21 between the tubular body 11 and the inside wall of the tubular case 2 form a sort of trap fit to prevent or to reduce the risk of the passage, toward the engine, of extraneous objects such as nuts, screws, washer, split pin and the like. The conformation of the tubular body 11 in a remarkable manner provides a low resistance and low dynamic losses of air flow feeding the engine without added weight and without reducing the inside volume of the device.

An advantage of the present invention is to propose an air filter device having low resistance able to stop an extraneous object, also having big dimensions, inside the case downstream of the filter without reducing the useful volume of the device and without making it heavy.

Another advantage is to propose a device that can be easily housed in the engine compartment through its oval or elliptic section shape.

The invention claimed is:

1. A low resistance air filter device comprising:
a tubular case (2) for receiving a tubular shaped filtering element (3) having a lower end and an upper end, the filtering element located in the tubular case so as to receive an air flow from a lower air inlet opening (5) provided in a lower opening (9) of the case (2), the tubular case having an upper opening (10), and outlet means (8) disposed over the upper opening (10) and having an outflow opening (7) for discharging filtered air, the outlet means having a trumpet shaped tubular body (11) projecting inwardly from the outlet means into an interior volume of the tubular case, and defining a recess forming a trap (21) between the trumpet shaped tubular body and an inside wall of the tubular case, the trap (21) capturing objects downstream of the filtering element to prevent transport of the objects with the filtered air, the trumpet shaped tubular body connecting the interior volume of the tubular case with the outflow opening (7), for leading filtered air thereto, deflecting means (6) disposed within the filtering element, the deflecting means forcedly deflecting the air flow received from the lower inlet opening (5) towards a filter contained within the filter element, for filtering the air passing therethrough as the air flows to the interior volume of the tubular case and then towards the outflow opening.

2. The low resistance air filter device of claim 1 wherein the outlet means (8) are formed integral with the tubular body (11).

3. The low resistance air filter device of claim 1 wherein the trumpet shaped tubular body (11) enlarges from the outlet means (8) towards the filtering element.

4. The low resistance air filter device of claim 1 wherein the trumpet shaped tubular body (11) is narrowed from the outlet means towards the filtering element.

5. The low resistance air filter device of claim 1 further comprising support means (4) fixed to the lower opening (9) of the tubular case.

6. The low resistance air filtering device of claim 1 wherein said outlet means (8) are provided with a peripheral recess (14) for mating to an inside wall of said tubular case (2) at the upper opening (10).

7. The low resistance air filter device of claim 1 wherein said outlet means (8) are detachably mounted to said tubular case (2).

8. The low resistance air filter device of claim 1 wherein the deflecting means (6) are substantially shaped as a cone having a vertex directed toward the lower air inlet opening (5) and having a base integrally fixed to an upper edge of the filtering element.

9. The low resistance air filter device according to claim 8 wherein said deflecting means (6) have an axial section shaped as two half-parabolas with parallel axes and having branches joined at the vertex for providing a concave (6*a*) profile or a convex (6*b*) profile.

10. The low resistance air filter device according to claim 1 wherein said tubular case (2) has an elliptical or oval cross section.

11. The low resistance air filter device of claim 1 wherein said tubular case (2) is made of a carbon fiber material.

12. The low resistance air filter device of claim 1 wherein said filter in said filtering element is made of cotton soaked with low viscosity oil.

13. The low resistance air filter device of claim 5 wherein said support means (4) are provided with a peripheral seat (13) for mating to a wall of said tubular case (2) at the lower opening (9) thereof.

14. The low resistance air filter device of claim 5 wherein said tubular case (2) is detachably mounted to said support means (4).

15. The low resistance air filter device of claim 5 wherein said support means (4) are made out of nylon strengthened with glass fiber.

16. The low resistance air flow device of claim 1 wherein said filtering element (3) is cylindrical.

17. The low resistance air filter device of claim 1 further comprising spacer means (20) positioned between the trumpet shaped tubular body (11) and the filtering element (3).

18. The low resistance air filter device of claim 17 wherein the spacer means (20) mate to the inside wall of the tubular case (2).

* * * * *